PREFERRED MINIMUM PROPORTION OF SOLIDS CONTRIBUTED BY GELATIN AS A FUNCTION OF PROPORTION OF SOLIDS CONTRIBUTED BY SUCROSE

United States Patent Office 3,826,854
Patented July 30, 1974

3,826,854
INSTANT MARSHMALLOW POWDER AND METHOD FOR ITS PRODUCTION
Charles A. Sanna, Madison, and Filip Leon Sanna, Mount Horeb, Wis., assignors to Beatrice Foods Co.
Filed Jan. 26, 1972, Ser. No. 220,883
Int. Cl. A23g 3/00
U.S. Cl. 426—163                               8 Claims

ABSTRACT OF THE DISCLOSURE

A particulate marshmallow powder having a moisture content of less than 6%, and which can be reconstituted in water to form a marshmallow paste. The powder's low moisture content and long shelf life make it suitable for incorporation in instant cocoa mix and other dried food products. A spray-drying process for production of the powder is also described.

---

Figure 1:
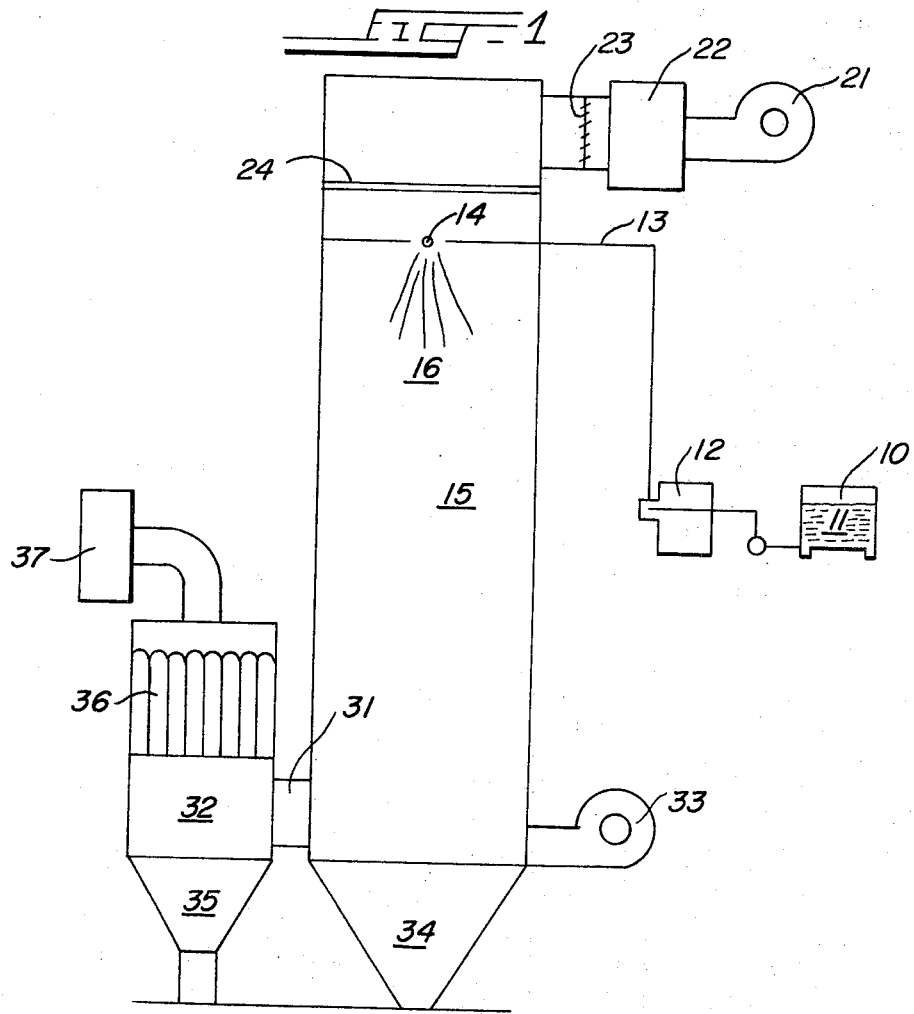

This invention relates to a new and improved marshmallow product in dried, powdered form, to a method for making the same, and to a solution used in manufacturing the product.

Marshmallows in the form usually sold typically contain, in addition to corn syrup solids, sucrose, gelatin, and flavoring, between about 15% and 18% moisture by weight. Such preparations are unsuited for inclusion with instant powdered hot cocoa mixes, instant cake frosting mixes, and other dried and powdered food products in which maintenance of a low moisture content is important for long shelf life. In these products, moisture can be transferred from the conventional marshmallow to the other ingredients, resulting in poor keeping qualities and undesirable caking of the whole mixture.

Marshmallows in the usual form cannot be economically converted to a powdered product with a small particle size in the range of less than 2000 microns. The powdered form has the advantages of being easier to handle and to dispense, and of being more adaptable to automatic packaging operations than the "bulk" form.

Marshmallow products in the usual bulk form, and having a moisture content as low as 1% of total weight, are known in the prior art. However, these products suffer the disadvantage of not being convertible to a free-flowing, particulate form which can be readily rehydrated.

Methods for preparing foods in dry, powdered form are known in the prior art, but none of these processes are completely suitable for production of a dried marshmallow powder of the type described herein. For example, it is necessary to control the concentration of gelatin in solutions which are spray-dried. If insufficient gelatin is dissolved relative to the amount of sucrose dissolved, then the final dehydrated product will coalesce into a solid mass rather than forming discrete particles. This product will have a hard, candy-like consistency which is undesirable for the applications of the disclosure. On the other hand, use of excessive quantities of gelatin greatly increases product costs. Another parameter which must be controlled in the solution is the total concentration of solids. This concentration must be both low enough to ensure that the solution is sprayable, and high enough to ensure that the spray particles can be dried economically.

In accordance with the practice of the present invention control of other parameters in the spray-drying process is also important. The temperature of the drying gas is preferably maintained within a limited range to balance the degree of dehydration of the final product with the cost of production. The orifice size and swirling characteristics of the nozzles used for spraying are controlled to obtain particle sizes within the desired range. And the solution is aerated with a suitable gas such as nitrogen or carbon dioxide in order to ensure a foamy texture in the rehydrated product.

It is the purpose of the present invention to provide a powdered marshmallow product suitable for inclusion in powdered instant hot cocoa mixes, instant cake frosting mixes, and in other products in which maintenance of a low moisture content is essential for long shelf life.

It is a principal object of the present invention to provide a dried marshmallow powder which is readily reconstitutable with water to form a marshmallow paste having a foamy texture or consistency.

It is a related object to provide a powdered marshmallow preparation with a moisture content of less than 6%, and which is relatively non-hygroscopic.

It is another object of this invention to provide a marshmallow preparation in dry, particulate form with an average particle size between about 100 and 500 microns. The powdered form possesses the advantages of being more readily reconstitutable with water, easier to handle and to dispense, and more adaptable to automatic handling and packaging operations than the bulk form in which marshmallows are usually sold. The lighter weight of the product of this invention also gives it the advantage of lower freight costs compared with the fully hydrated form.

Another object of this invention is to provide a dried marshmallow powder which, when mixed with hot chocolate drinks, will form a frothy topping. The marshmallow powder of the invention can either be premixed with instant hot cocoa mix, or added later.

Yet another object of the present invention is to provide an economical process for manufacturing the dry marshmallow powder of this invention.

A further, related object of this invention is to provide a solution which can be spray-dried to form a dry, reconstitutable marshmallow powder. By controlling the concentration of gelatin in this solution relative to the concentration of sucrose, as disclosed herein, a high quality final product is obtainable at an economical cost.

Figure 2:
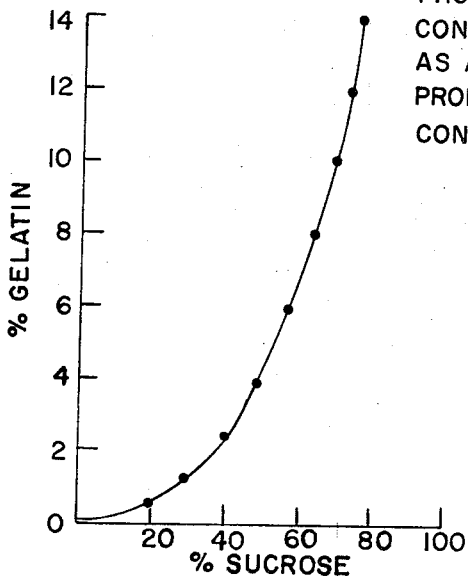

Other and further objects of this invention will become apparent upon reading the following specification in conjunction with the drawing in which:

FIG. 1 is a schematic diagram of the apparatus which is used to practice the method and to produce the product of the invention; and FIG. 2 is a graph depicting the relationship between the proportion or percentage of solids contributed by sucrose in the solution which is spray-dried, and the preferable minimum proportion or percentage of solids contributed by gelatin in the same solution.

The method of the present invention is practiced by spray-drying an aqueous solution containing sucrose, gelatin, corn syrup, and flavoring in the apparatus shown schematically in FIG. 1. In a preferred embodiment of the method, 10 pounds of gelatin are dry-blended with 50 pounds of sucrose to obtain a dry mixture which is then dissolved in 131 pounds of water at 130° F. Dry-blending hastens dispersion and dissolution of the gelatin. 65 pounds of corn syrup solids are next mixed with the sucrose-water solution, the solution is then heated to 175° F., and a suitable quantity of vanilla and vanillin flavoring is added.

The resulting solution contains 45.5% solids. The solids concentration may vary between 20% and 65% without impairing the effectiveness of the process. The dissolved solids in the example described above comprise 40% sucrose, 8% gelatin, and 52% corn syrup solids. Other combinations of ingredients which have been found suitable are listed in Table 1 and include the following ranges of proportions for the solid ingredients: sucrose 40 to 75%; gelatin 3 to 12½%; and corn syrup solids 12½ to 57%. Lower proportions of sucrose and gelatin and higher proportions of corn syrup solids are also operative.

air from the dryer. The final product is removed through the floors of both chambers. The product may be sieved if desired.

TABLE 1.—SPECIFIC EXAMPLES OF SUITABLE INGREDIENTS AND DRYING CONDITIONS

| Example No. | (1) | (2) | (3) | (4) |
|---|---|---|---|---|
| Ingredients,[1] percent: | | | | |
| Gelatin | 3 | 8 | 12½ | 2 |
| Sucrose | 40 | 65 | 75 | 65 |
| Corn syrup solids | 57 | 27 | 12½ | 23 |
| Flavoring | Negligible | Negligible | Negligible | Negligible |
| Gum arabic, percent | | | | 10 |
| Drying conditions: | | | | |
| Size and No. of nozzles | (7) 50 x 20 | (7) 50 x 20 | (10) 50 x 20 | (10) 50 x 20 |
| Preheat temperature, °F | 175 | 150 | 150 | 175 |
| Pressure, p.s.i., lbs | 1,000 | 1,000 | 1,000 | 1,000 |
| Aeration | 05 | 04 | 02 | 01 |
| Solids concentration in solution, percent | 40 | 40 | 45½ | 40 |
| Inlet air temperature, °F | 340 | 320 | 380 | 300 |
| Auxiliary air | (2) | (2) | (2) | (2) |
| Louvers | 15/9 | 15/9 | 15/9 | 15/9 |
| Outlet air temperature, °F | 170 | 165 | 185 | 160 |
| Finished product: | | | | |
| Particle size (approximate average), micron | 250 | 250 | 200 | 150 |
| Flow characteristics | (3) | (3) | (3) | (3) |
| Moisture, percent | 1.1 | 3.0 | 3.5 | 3.0 |
| Hygroscopicity | (4) | (4) | (4) | (4) |
| Density, grams/pint | 46 | 65 | 77 | 100 |
| Color | (5) | (5) | (5) | (5) |
| Flavor | (6) | (6) | (6) | (6) |

[1] All percentages are by weight; [2] On; [3] Free flowing; [4] Relatively low; [5] Marshmallow white; [6] Marshmallow.

Various other ingredients may be substituted for the ingredients listed. Substitutions may be desirable in order to reduce costs, or to impart specific physical characteristics to the end product. Gelatin, the most expensive of the three main ingredients, may be replaced in whole or in part by egg albumen, gum arabic, sodium caseinate, or other suitable materials. The corn syrup is replaceable by various starches, dextrines, and other fillers. Dextrose, lactose, and other sugars may be used in addition to or in place of sucrose. Flavorings other than, or in addition to vanilla and vanillin may be added to the product for special applications.

The process steps of the invention are practiced in the apparatus shown schematically in FIG. 1. A vat 10 is used for mixing the solution 11 described above. A high pressure pump 12 then conveys the solution 11 at a pressure of between 300 and 2000 p.s.i. to a nozzle header 13 which terminates in a set of seven nozzles 14 which spray the solution into a large drying chamber 15. The pressure of the solution is preferably maintained at about 1000 p.s.i., although greater pressures are useful for increasing production rates. The solution is aerated with a suitable gas such as nitrogen or carbon dioxide before it is sprayed.

The spray droplets 16 released from the nozzles 14 are then contacted with low-moisture air which has been heated to a temperature of between 200° F. and 400° F. This air is supplied by an inlet air fan 21 which moves atmospheric air through a heater 22, louvers 23 and a perforated plate 24 into the spray chamber or drying chamber 15. The heater 22 uses natural gas heat in the preferred embodiment shown, although steam and other energy supply means are also suitable. The air is heated to achieve an inlet air temperature ranging from 200° F. to 400° F. This temperature measures 340° F. in the embodiment described herein. Higher temperatures can be used to increase production rates and to decrease the moisture content of the product.

The nozzles 14 impel a fine, swirling spray of droplets 16 downwardly in the main spray chamber 15. This chamber 15 is cylindrical and has a total height of 45 feet and a diameter of 12 feet in the embodiment shown. The main spray chamber 15 opens laterally through a wide passageway or shunt 31 into a "dust" collection chamber 32. An auxiliary air fan 33 blows filtered, ambient air into the dryer for product cooling purposes. Particles of the final, dried product are deposited at the bottoms 34 and 35 of both chambers.

The moisture laden drying air is removed upwardly through filter bags 36 or other preferred filter means in the upper portion of the dust collection chamber 32. An exhaust fan 37 aids in removal of moisture laden drying The final product is a white powder which has marshmallow flavor. The average particle size is between 150 and 250 microns in the example outlined in Table 1, although larger or smaller particles are readily obtainable by varying the conditions under which the drying process is conducted. Densities ranging from 46 to 100 grams/pint have been obtained, depending upon the degree of aeration employed.

While the spray dryer described above is preferred, spray dryers of other designs may be used and other methods of spraying including centrifugal force and air or steam atomizers may be employed.

The products obtained under the conditions specified in Table 1 have moisture contents of between 1.0% and 3.5%. Still lower moisture contents are obtainable, although at increased cost, by raising the temperature of the inlet air. It is not desirable to form a product with a moisture content of greater than 6%, since this increases the possibility of coalescense of the particles. The product is relatively non-hygroscopic, and it keeps for long periods of time without caking.

Upon addition of water, the product forms a white, frothy paste having a foamy texture. This paste floats on water. The product has found its most useful application when mixed in a concentration of between 4% and 10% by weight with instant hot cocoa mix. Lesser and greater concentrations in the range of between 1% and 15%, are also suitable. One instant cocoa mix which has been found suitable for this purpose consists of instant nonfat dry milk, sugar, cocoa, salt, vanilla, vanillin, and vitamin D. When this powdered mixture is reconstituted in hot water, the marshmallow powder forms a frothy white paste which floats to the top of the drink. The dried marshmallow powder can also be added in any desired concentration to hot cocoa after it has been mixed. The product is also useful in dried cake frosting mixes and in other applications which require a marshmallow preparation having excellent keeping qualities.

In view of the above disclosure describing the invention in connection with several preferred embodiments, certain changes which may be made in the composition of the product and in the method of production without departing from the scope of the invention will readily occur to those skilled in the art. It is to be understood that this description is illustrative only, and is not intended to limit the invention, the scope of which is defined by the appended claims.

What is claimed is:

1. A particulate, free-flowing, relatively non-hygroscopic marshmallow powder which is readily reconstitutable in water to form a marshmallow paste, said powder comprising between about 12½ and 57 parts by weight corn syrup solids, between about 40 and 75 parts by weight sucrose, between about 3 and 12½ parts by weight gelatin, and less than about 6 parts by weight moisture.

2. The marshmallow powder of claim 1, wherein the concentration of gelatin in said powder in relation to the concentration of sucrose is sufficient to prevent coalescence of the powder, said concentration of gelatin being greater than 3% of total solids in said powder and at least as great as the value indicated by the curve of FIG. 2 for sucrose concentrations in the range of from about 40% to 75% of total solids in said powder.

3. The marshmallow powder of claim 1, wherein said powder is characterized by an approximate average particle size of between 100 and 500 microns.

4. The marshmallow powder of claim 1, and further comprising instant cocoa mix as a major component thereof, said instant cocoa mix being added in an amount sufficient to form a final powdered product containing between about 1% and 15% by weight of said marshmallow powder.

5. A solution comprising between about 20% and 65% solids dissolved in water, said solids comprising between about 12½% and 57% corn syrup solids, between about 40% and 75% sucrose, and between about 3% and 12½% gelatin; and wherein the concentration of gelatin in said solution in relation to the concentration of sucrose is at least as great as the value indicated by the curve of FIG. 2 for sucrose concentrations in the range of from about 40% to 75%.

6. A method of producing a free-flowing, relatively non-hygroscopic marshmallow product in powdered form readily reconstitutable in water to form a foamy marshmallow paste, said method comprising the steps of:
dissolving sucrose, gelatin and corn syrup in water to obtain a solution containing between about 20% and 65% solids,
controlling the concentration of gelatin in said solution in relation to the concentration of sucrose to a value at least as great as that concentration of gelatin as a function of concentration of sucrose indicated by the curve of FIG. 2,
heating said solution to a temperature of between 140° F. and 180° F.,
aerating said solution,
forcing said solution through a spray nozzle having a small orifice to convert said solution into finely divided spray patricles,
heating a low-moisture gas to a temperature of between 200° F. and 400° F., and
contacting said spray particles with said gas to form a marshmallow powder having a moisture content of less than about 6%.

7. The method of claim 6, and further comprising dry-blending said sucrose and said gelatin prior to dissolving said sucrose and said gelatin, thereby to enhance dispersion and dissolution of said gelatin.

8. A mixture of ingredients soluble in water to form a solution spray-dryable to form a free-flowing, relatively non-hygroscopic marshmallow product in dry, powdered form readily reconstitutable with water to make a foamy marshmallow paste, said mixture comprising between about 12½% and 57% corn syrup solids, between about 40% and 75% sucrose, and between about 3% and 12½% gelatin; and wherein the concentration of gelatin in said mixture in relation to the concentration of sucrose is sufficient to prevent coalescence of the powder, said concentration of gelatin being greater than 3% of total solids in said mixture of ingredients and at least as great as the value indicated by the curve of FIG. 2 for sucrose concentrations in the range of from about 40% to 75% of total solids in said mixture of ingredients.

References Cited
UNITED STATES PATENTS

| | | | |
|---|---|---|---|
| 3,018,183 | 1/1962 | Downey | 99—134 |
| 3,345,186 | 10/1967 | Kania et al. | 99—134 A |
| 3,586,513 | 6/1971 | Harn | 99—134 A |
| 3,533,805 | 10/1970 | Nava et al. | 99—199 |

A. LOUIS MONACELL, Primary Examiner
J. M. HUNTER, Assistant Examiner